United States Patent
Guan

(10) Patent No.: US 8,965,052 B2
(45) Date of Patent: Feb. 24, 2015

(54) TARGET RECOGNITION SYSTEM AND TARGET RECOGNITION METHOD EXECUTED BY THE TARGET RECOGNITION SYSTEM

(71) Applicant: Haike Guan, Kanagawa (JP)

(72) Inventor: Haike Guan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 85 days.

(21) Appl. No.: 13/905,331

(22) Filed: May 30, 2013

(65) Prior Publication Data

US 2013/0322692 A1 Dec. 5, 2013

(30) Foreign Application Priority Data

Jun. 1, 2012 (JP) ................................. 2012-126412
Apr. 2, 2013 (JP) ................................. 2013-077228

(51) Int. Cl.
*G06K 9/00* (2006.01)
(52) U.S. Cl.
CPC ........ *G06K 9/00791* (2013.01); *G06K 9/00798* (2013.01); *G06K 9/00805* (2013.01)
USPC .............................. 382/103; 348/169; 701/93
(58) Field of Classification Search
USPC ......... 382/100, 103, 162, 164, 165, 171, 173, 382/181, 190, 195, 203, 206; 348/169–172; 701/1, 93, 96, 117, 118, 119, 120, 121, 701/122, 400
See application file for complete search history.

(56) References Cited

U.S. PATENT DOCUMENTS

| 7,203,362 | B2 * | 4/2007 | Sato et al. ...................... 382/173 |
| 7,324,687 | B2 * | 1/2008 | Zitnick et al. .................. 382/154 |
| 7,489,803 | B2 * | 2/2009 | Haynes et al. ................. 382/103 |
| 8,108,119 | B2 * | 1/2012 | Southall et al. ................. 701/96 |
| 8,311,281 | B2 * | 11/2012 | Ikeda ............................. 382/103 |
| 2002/0039443 | A1 * | 4/2002 | Sakamoto ..................... 382/173 |
| 2005/0129275 | A1 * | 6/2005 | Porter et al. ................... 382/103 |
| 2007/0255480 | A1 * | 11/2007 | Southall et al. ................. 701/96 |
| 2011/0052061 | A1 * | 3/2011 | Jeong et al. ................... 382/173 |
| 2012/0148094 | A1 * | 6/2012 | Huang et al. .................. 382/103 |
| 2012/0300078 | A1 * | 11/2012 | Ogata et al. ................... 348/148 |
| 2014/0133700 | A1 * | 5/2014 | Seki ............................. 382/103 |

FOREIGN PATENT DOCUMENTS

JP 2008-146549 6/2008
JP 2013-092975 5/2013

OTHER PUBLICATIONS

Lee, Chung-Hee et al. "Stereo vision-based vehicle detection using a road feature and disparity histogram." *Optical Engineering*, vol. 50, No. 2, Feb. 22, 2011 (pp. 027004-1-027004-23).
Gerónimo, David et al. "Survey of Pedestrian Detection for Advanced Driver Assistance Systems." *IEEE Transactions on Pattern Analysis and Machine Intelligence*, vol. 32, No. 7, Jul. 1, 2010 (pp. 1239-1258).
Keller, Christoph et al. "The Benefits of Dense Stereo for Pedestrian Detection." *IEEE Transactions on Intelligent Transportation Systems*, vol. 12, No. 4, Dec. 1, 2011 (pp. 1096-1106).
Extended European Search Report dated Oct. 22, 2014 issued in corresponding European Application No. 13169614.8.

* cited by examiner

*Primary Examiner* — Anand Bhatnagar
(74) *Attorney, Agent, or Firm* — Harness, Dickey & Pierce, P.L.C.

(57) ABSTRACT

A target recognition system and a target recognition method to recognize one or more recognition targets, operatively connected to an imaging device to capture an image of an area ahead of the target recognition system, each of which includes a recognition area detector to detect multiple recognition areas from the captured image; a recognition weighting unit to set recognition weight indicating existence probability of images of the recognition targets to the respective recognition areas detected by the recognition area detector; and a target recognition processor to recognize the one or more recognition targets in a specified recognition area based on the recognition weight set in the respective recognition area.

10 Claims, 10 Drawing Sheets

☐ : CANDIDATE SET OF RECOGNITION TARGET AREAS

☐ : CANDIDATE SET OF RECOGNITION TARGET AREAS

301

302

☐ : CANDIDATE SET OF RECOGNITION TARGET AREAS

FIG. 10

| RECOGNITION TARGET | ROAD AREA | ROADSIDE AREA | AREA ABOVE HORIZON LINE | OTHERS |
|---|---|---|---|---|
| VEHICLE ON ROAD | 1 | 0 | 0 | 0 |
| PEDESTRIAN ON ROAD | 1 | 0 | 0 | 0 |
| PEDESTRIAN ON SIDE STRIP | 0 | 1 | 0 | 0 |
| BUILDINGS | 0 | 0 | 1 | 1 |

FIG. 11

| RECOGNITION TARGET | ROAD AREA | ROADSIDE AREA | AREA ABOVE HORIZON LINE | OTHERS |
|---|---|---|---|---|
| VEHICLE ON ROAD | 1.0 | 0 | 0 | 0.1 |
| PEDESTRIAN ON ROAD | 0.9 | 0 | 0 | 0.1 |
| PEDESTRIAN ON SIDE STRIP | 0 | 1.0 | 0 | 0.3 |
| BUILDINGS | 0 | 0 | 1.0 | 0.5 |

FIG. 12
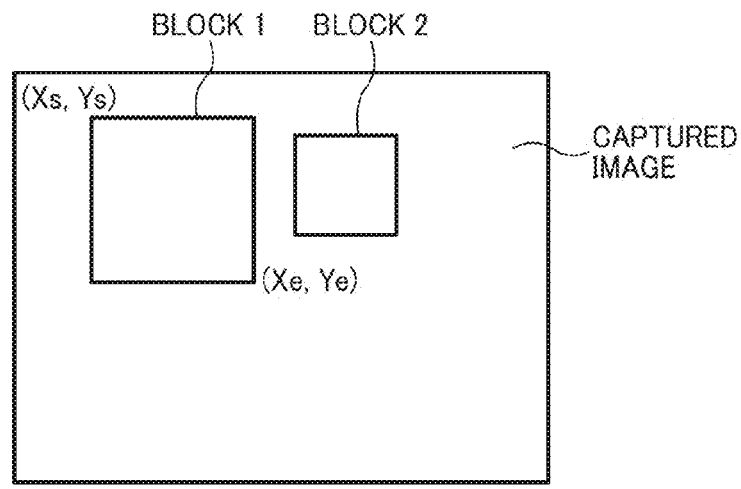
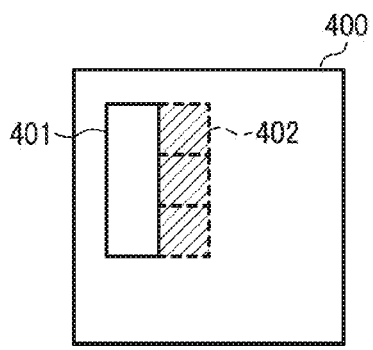
FIG. 13A
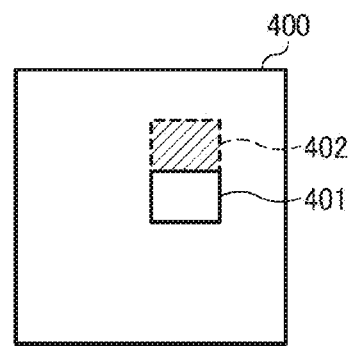
FIG. 13B
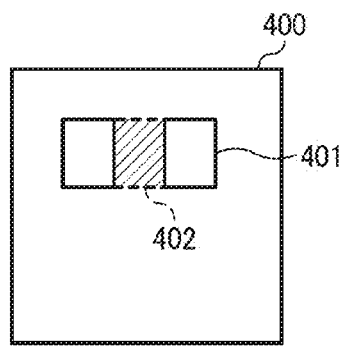
FIG. 13C
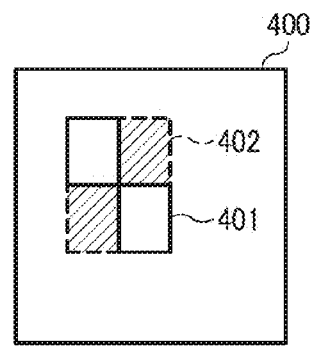
FIG. 13D

☐ : CANDIDATE SET OF RECOGNITION TARGET AREAS

☐ : CANDIDATE SET OF RECOGNITION TARGET AREAS

TARGET RECOGNITION SYSTEM AND TARGET RECOGNITION METHOD EXECUTED BY THE TARGET RECOGNITION SYSTEM

CROSS-REFERENCE TO RELATED APPLICATIONS

This patent application is based on and claims priority pursuant to 35 U.S.C. §119 to Japanese Patent Application Nos. 2012-126412, filed on Jun. 1, 2012 and 2013-077228, filed on Apr. 2, 2013 in the Japan Patent Office, the entire disclosures of which are hereby incorporated by reference herein.

BACKGROUND

1. Technical Field

The present invention relates to a target recognition system to recognize one or more recognition targets, and a recognition method executed by the target recognition system.

2. Related Art

At present, vehicle-mounted recognition systems that recognize obstacles based on a captured image of the area ahead of the vehicle are widely used for driver support systems such as adaptive cruise control (ACC), to reduce the burden on the driver.

The driver support systems provide various functions, including a brake-control-and-alert function that alerts the driver to take corrective action to avoid a collision or reduce the impact of the collision, a driving speed adjustment function to maintain a safe minimum distance between vehicles, and a stray prevention function to prevent the vehicle from straying into another lane.

In JP-2008-146549-A, a driver support system that attempts to alleviate the burden on the driver of the vehicle by recognizing targets based on the image of area ahead of the vehicle captured by the imaging devices is disclosed. In order to recognize the targets shown in the captured image, the color and spatial frequency of the target are detected from the captured image. By integrating the detected spatial frequency for generating a distribution of the spatial frequency, the characteristics of the spatial frequency are detected. Then, the recognition target is recognized by comparing the detected target color and spatial frequency characteristics with predetermined target color and spatial frequency characteristics.

In order to implement the driver support system, it is necessary to recognize obstacles in the way of the vehicle accurately. However, in the above-described driver support system, the captured image may contain an image of an object similar to the recognition target. The system performs the same predetermined recognition processing to compare color and spatial frequency features of the image of the similar object with those of the recognition targets. As a result, the image of the object similar to the recognition target may be falsely recognized as the image of the recognition target, which makes it difficult to for the driver support system to function as intended.

SUMMARY

In one exemplary embodiment of the present disclosure, there is provided a target recognition system to recognize one or more recognition targets, operatively connected to an imaging device to capture an image of an area ahead of the target recognition system. The target recognition system includes a recognition area detector, a recognition weighting unit, and a target recognition processor. The recognition area detector detects multiple recognition areas from the captured image. The recognition weighting unit weights the probability of images of the recognition targets being present in each of the respective recognition areas detected by the recognition area detector. The target recognition processor recognizes the one or more recognition targets in a specified recognition area based on the recognition weighting given to the respective recognition areas.

In another aspect of the present disclosure, there is a provided a target recognition method executed by the above-described target recognition system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a table illustrating one example of a setting table of recognition weighting;

FIG. 11 is a table illustrating one example of a setting table of the recognition weighting;

FIG. 12 illustrates the image including multiple rectangular blocks;

FIGS. 13A through 13D illustrates examples of feature patterns in the rectangular blocks;

DETAILED DESCRIPTION

Figure 1:
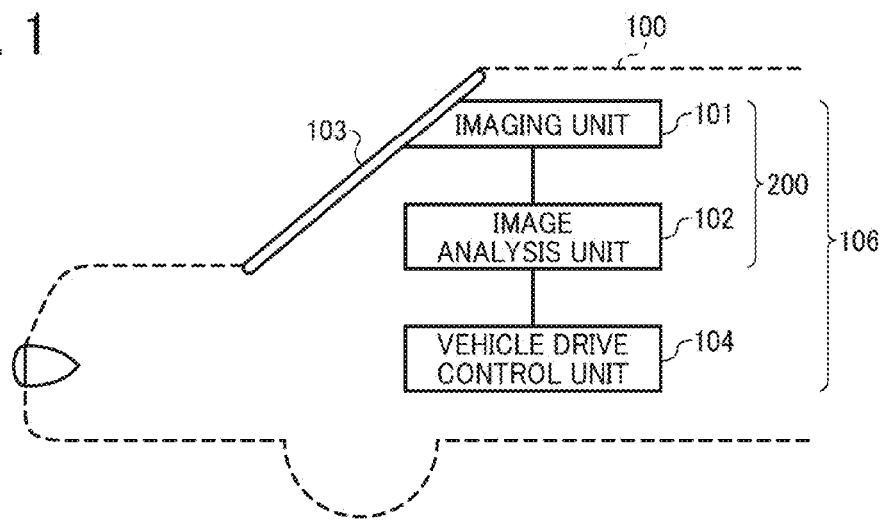
FIG. 1 is a schematic diagram illustrating an in-vehicle control system including a target recognition system, according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. Referring now to the drawings, wherein like reference numerals designate identical or corresponding parts throughout the several views thereof, and particularly to FIGS. 1 through 17, a target recognition system according to illustrative embodiments of the present disclosure is described.

Initially, a vehicle-mounted control system includes a target recognition system as in-vehicle system. It is to be noted that the target recognition system according to the present disclosure is not limited to an in-vehicle control system, and thus, for example, the target recognition system may be used for an object detection device that detects the object based on captured images.

FIG. 1 is a schematic diagram illustrating an in-vehicle control system 106 including a target recognition system 200 according to the present disclosure. The in-vehicle control system 106 controls the various devices in a vehicle 100 such as a car in accordance with recognition of targets using the captured image of the road in front of the vehicle 100 acquired by an imaging unit 101 installed in the vehicle 100.

In FIG. 1, the in-vehicle control system 106 includes the imaging unit 101, an image analysis unit 102, and a vehicle drive control unit 104. The imaging unit 101 is provided as a capture device to capture an image of the area in front of the vehicle 100 in the direction of travel. For example, the imaging unit 101 is provided near a rearview mirror near a windscreen 103 of the vehicle 100. The various data, such as, captured data acquired by the imaging unit 101 is input to the image analysis unit 102 as an image processor. The image analysis unit 102 analyzes the data transmitted from the imaging unit 101, calculates the position, the direction, and the distance of another vehicle in front of the vehicle 100, and detects the dividing line as the lane border. When another vehicle (leading vehicle, oncoming vehicle) is detected, another vehicle is recognized as a recognition target on the road based on the luminance image.

In addition, the calculation result of the image analysis unit 102 is transmitted to the vehicle drive control unit 104. The vehicle drive control unit 104 performs driving support control to report the alert and control the steering and brakes of the vehicle 100, based on the detection of the recognition target such as another vehicle and pedestrian. The vehicle drive control unit 104 provides various functions having a brake-control-and-alert function that alerts the driver to take corrective action to avoid a collision or reduce the impact of the collision, and a driving speed adjustment function to maintain a safe minimum distance between vehicles by engaging a control device such as the brakes and the steering.

Figure 2:
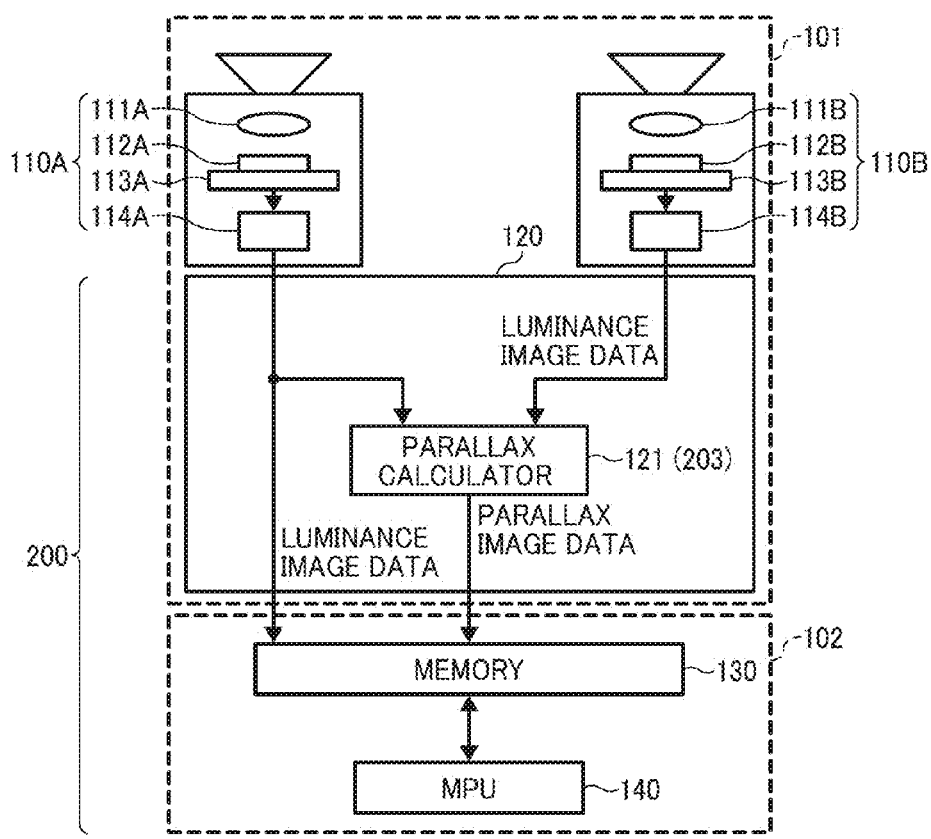
FIG. 2 is a diagram illustrating a configuration of an imaging unit and an image analysis unit shown in FIG. 1.

FIG. 2 is a diagram illustrating a configuration of the imaging unit 101 and the image analysis unit 102. The imaging unit 101 is a stereo camera system that includes two cameras 110A and 110B, and the two cameras 110A and 110B have similar configuration. Respective cameras 110A and 110B include capturing lenses 111A and 111B, optical filters 112A and 112B, and image sensors 113A and 113B on which image capturing elements are two-dimensionally arranged. The imaging unit 101 outputs luminance data.

In addition, the imaging unit 101 includes a process hardware unit 120 constituted by a field programmable-gate array (FPGA). The process hardware unit 120 includes a parallax calculator 121 to calculate parallaxes in the corresponding portions between the captured images, for acquiring the parallax data based on the luminance image data output from the respective imaging units 110A and 110B. Herein, when one captured image acquired by one of the imaging devices 110A and 110B is a reference image and the other captured image acquired by the other of the imaging devices 110A and 110B is a comparison image, the parallax for a certain area is calculated as position deviation in the certain image area in the comparison image correlated to the certain image area in the reference image. Using fundamental of triangulation, the distance from the stereo camera system to the same object corresponding to the certain image area in the captured image areas can be calculated based on the calculated parallax.

The image analysis unit 102 includes a memory 130 and a micro processing unit (MPU) 140. The memory 130 stores luminance image data and parallax image data output from the imaging unit 101. The MPU 140 installs software that performs recognition processing to recognize targets and controls the parallax calculation.

Figure 3:
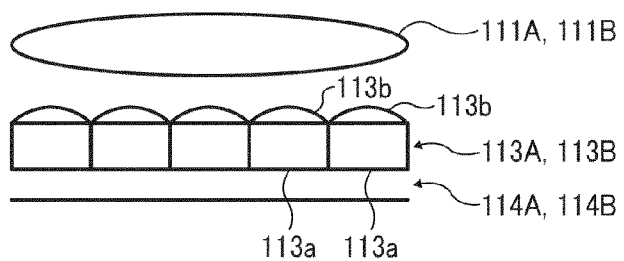
FIG. 3 is a schematic expanded view illustrating optical filters shown in FIG. 2 viewed from a direction orthogonal to an optical transmission direction.

FIG. 3 is a schematic expanded view illustrating the optical filters 112A and 112B and the image sensors 113A and 113B viewed from a direction orthogonal to an optical transmission direction. Each of the image sensors 113A and 113B is constituted by, such as, charge coupled device (CCD) and Complementary Metal Oxide Semiconductor (CMOS), and the image capturing element (light-receiving element) is formed by photodiodes 113a. The photodiodes 113a are two dimensionally arranged for each of the imaging pixels in the image sensors 113A and 113B. In order to improve the focus efficiency, a micro lens 113b is provided on the incoming side of the photodiodes 113a. By connecting the image sensors 113A and 113B by printed wiring board (PWB) bonded by wire boding method, sensor substrates 114A and 114B are formed.

Figure 4:
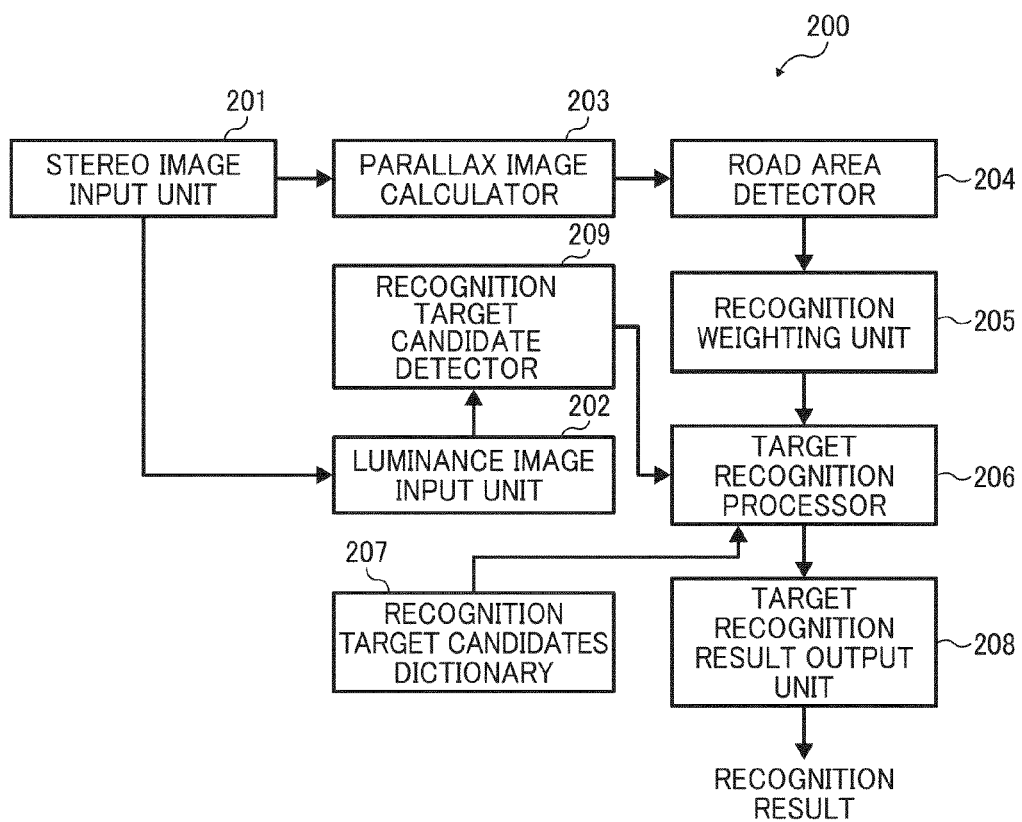
FIG. 4 is a block diagram illustrating a configuration of a target recognition system.

Next, the target recognition process executed by the imaging unit 101 and the image analysis unit 102 (target recognition system 200) is described below with reference to FIG. 4. FIG. 4 is a block diagram illustrating a configuration of the target recognition system 200 according to the present embodiment. In FIG. 4, the target recognition system 200 includes a stereo image input unit 201, a luminance image input unit 202, a parallax image calculator 203, a road area detector 204, a recognition weighting unit 205, a recognition target candidate detector 209, a parallax image calculator 206, a recognition target candidate dictionary 207, and a recognition result output unit 208.

The luminance image input unit 202 receives the luminance image of right image or left image of the stereo image from the stereo image input unit 201. The input stereo image and the luminance image are stored in the memory 130 in the stereo camera system 101. The parallax image calculator 203 calculates the parallax (parallax image) of the captured targets that is the difference of the focusing position between the right image and the left image. The road area detector 204, serving as a recognition area detector, detects the road area from the captured image, using the parallax image calculated by the parallax image calculator 203. The recognition weighting unit 205 gives recognition weighting to the respective areas such as the road area or the rest area other than the road area such as sidewalk area, side strip area or background area. For example, when the recognition target is another vehicle, the recognition weighting unit 205 provides 1 recognition weighting to the road area and 0 recognition weighting to the rest area. The recognition target candidate detector 209 extracts a candidate set of the recognition target areas from the luminance image input from the luminance image input unit 202.

Then, the target recognition processor 206 performs recognition processing to recognize the recognition target from the candidate set of recognition target areas of a specific image area where the recognition weighting unit 205 weights the heavy probability of the image of the recognition targets being present from the candidate set of recognition target areas extracted by the recognition target detector 209. The recognition target candidate dictionary 207 is generated by the machine leaning method such as support vector machine (SVM) and generate image sample leaning data of the tare recognition in advance. The recognition target candidate dictionary 207 is generated for each of the respective recognition targets. The target recognition processor 206 performs the recognition processing. The target recognition processor 206 uses the recognition target candidate dictionary 207 to recognize the recognition targets. The target detection result output unit 208 outputs the recognition result of the recognition targets.

Figure 5:
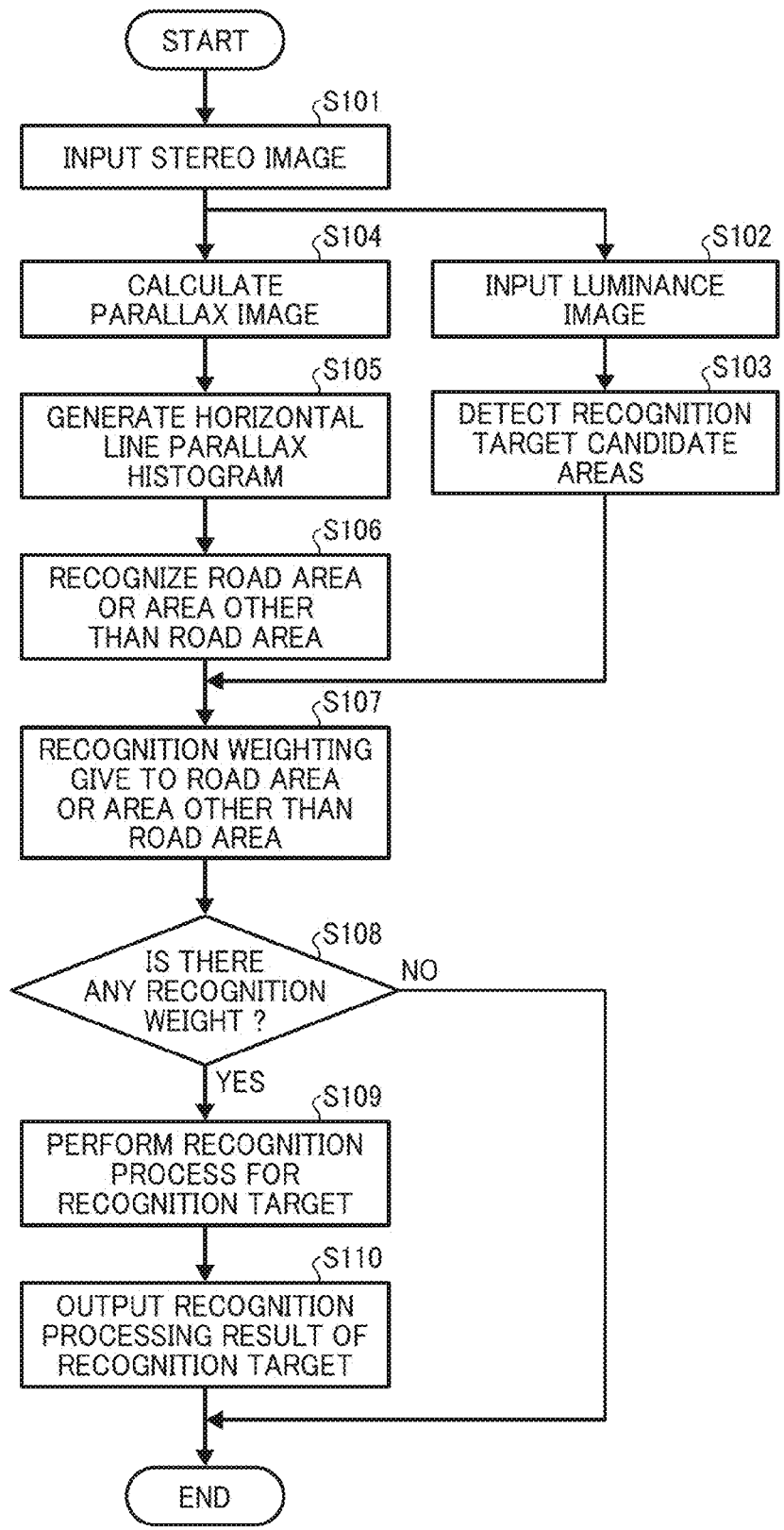
FIG. 5 is a flow chart illustrating target recognition process executed by the target recognition system.
Figure 6:
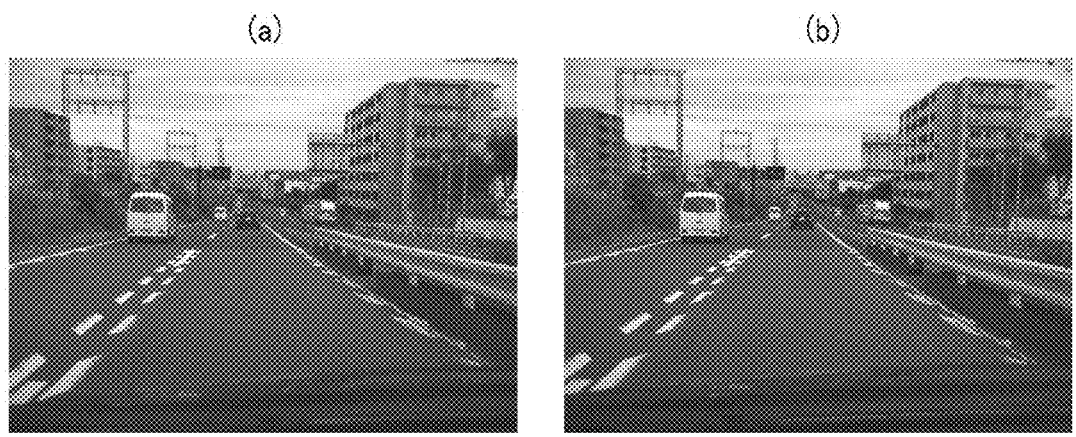
FIG. 6 is one example of the stereo image.

Next, operation flow of the target recognition system 200 is described below with reference to FIG. 5. FIG. 5 is a flow chart illustrating target recognition process executed by the target recognition system 200. At step S101, the stereo image is input from stereo camera 101 to the stereo image input unit 101 (see FIG. 4). FIG. 6 is one example of a stereo image. The same subject in the stereo image is positioned at different imaging positions in the right image and left image.

Then, the luminance image input unit 202 outputs luminance image of left image or right image at step S102. The input stereo image and the luminance image are saved in the memory 516 in the stereo camera system.

At S103, the recognition target candidate detector 209 recognizes the candidate set of the recognition target areas where the recognition target is present, based on the luminance image stored in the memory in the stereo camera system.

Along with these processes, the parallax image calculator 203 calculates the parallax that is a difference between the image forming positions of the left image and the right image in the object of the stereo image, using the stereo image input from the stereo image input unit 201 at step S104. More specifically, the parallax image where the parallax is treated as the pixel value is calculated based on the same areas between the left image and the right image formed by the left image lens 111A and right image lens 111B using the block matching method.

The block matching method is the method to divide the left image and the right image into multiple blocks and calculate the parallaxes based on the blocks where the degree of similarity between the left image and the right image is largest in the blocks and blocks between the left image and the right image is matched. For example, the image having 1280×960 pixels is divided into 5×5 pixel-size blocks. Then, the parallax is calculated using the respective blocks. The optimum values of the block sizes are set by adjusting through the experiment.

Figure 7:
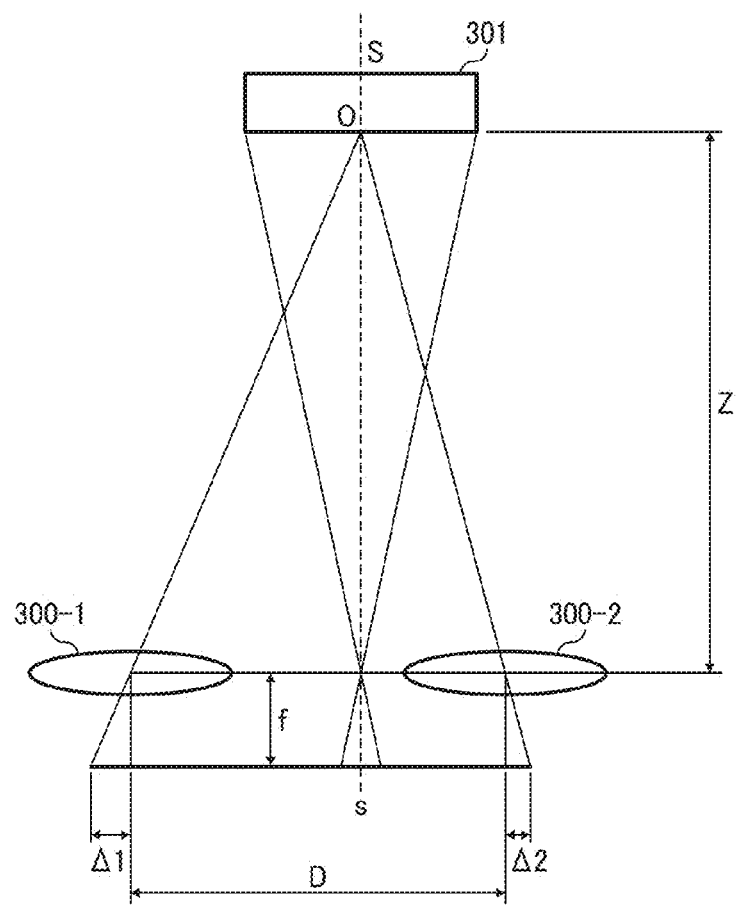
FIG. 7 is a fundamental view illustrating a range finding in the stereo camera shown in FIG. 1.
Figure 8:
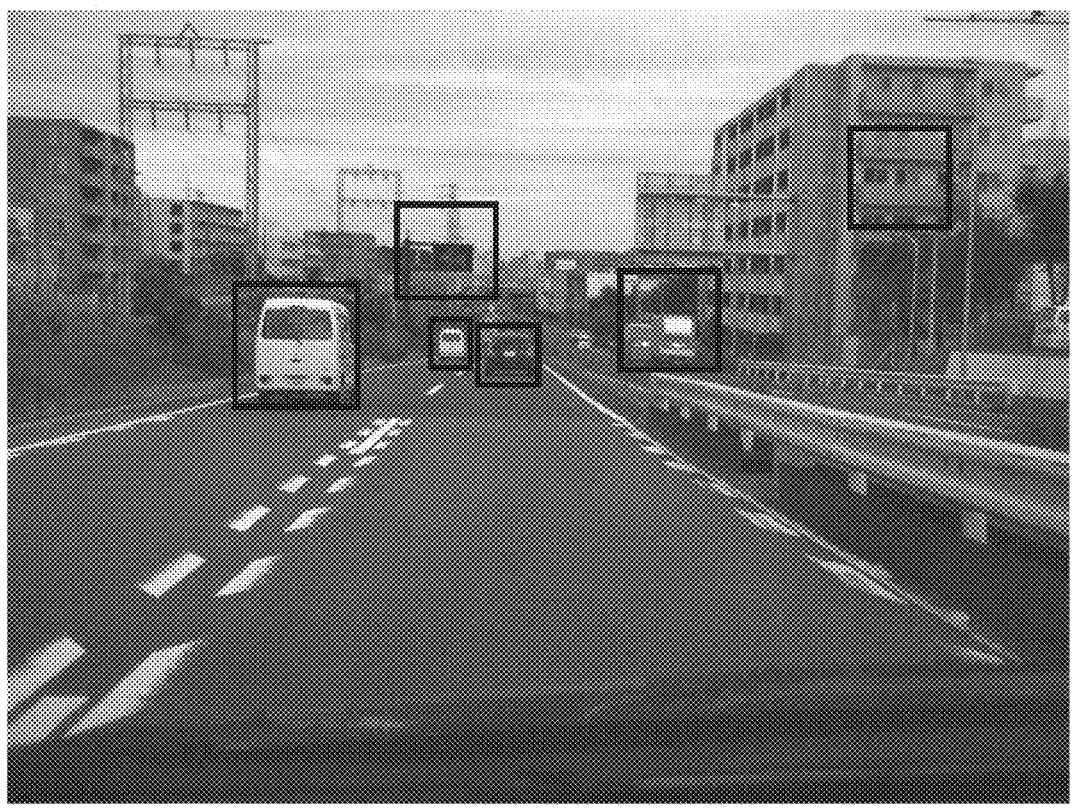
FIG. 8 is the captured image including multiple rectangular candidate set of recognition target areas.

In one example illustrated in FIG. 7, $\Delta 1$ and $\Delta 2$ represent distances from image center positions to actual image positions in the right image and the left image showing a point O in the capturing target. Accordingly, the parallax $\Delta$ can be obtained by adding the distance $\Delta 1$ and the distance $\Delta 2$ ($\Delta = \Delta 1 + \Delta 2$). Accordingly, the parallax image has parallaxes in the corresponding pixel positions.

Figure 9A:
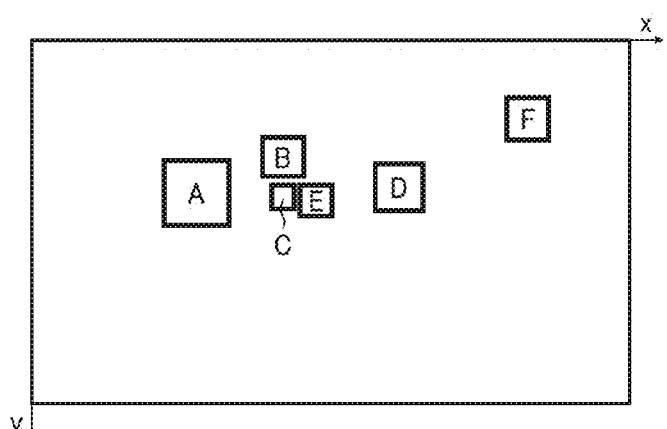
FIG. 9A is the image including multiple rectangular blocks.
Figure 9B:
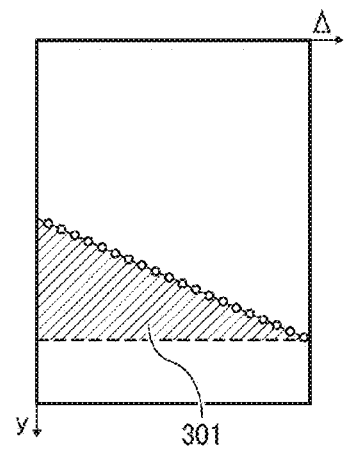
FIG. 9B is a graph illustrating a frequency value distribution at the parallaxes.

At step S105, the road area detector 204 (FIG. 4) generates a horizontal line parallax histogram shown in FIG. 9B, using the parallax image acquired by the parallax image calculator 203. The horizontal line parallax histogram represents the histogram acquired by integrating the parallaxes contained in a single horizontal line of the parallax image shown in FIG. 9A. That is, a graph of FIG. 9B represents frequency distribution $H(\Delta, y)$ at the parallaxes. In FIG. 9A, a horizontal axis presents the parallax $\Delta$, and a vertical axis represents the parallax image. The values of the respective pixels of the horizontal line parallax histogram correspond to histogram values $H(\Delta, y)$ of a single line at a height "y" of the parallax image. When the road area is present, the parallax histogram H on the signal horizontal line at a height y from the road has a great value because the entire parallax pixels converge to a same parallax $\Delta y$.

In the road area, the horizontal line of the respective parallax images are constant on the horizontal line parallax histogram of FIG. 9B, and the parallaxes are gradually changed, and the histogram values $H(\Delta, y)$ are arranged the starlight line on the horizontal line parallax histogram. After the pixels arranged in the straight line on the horizontal line parallax histogram are detected, the pixels arranged in the straight line are found (mapping process) in the parallax image shown in FIG. 9A. That is, by correlating the pixels arranged in straight line on the horizontal line parallax histogram to the pixels on the road image in the parallax image, a border of a road area 301 can be identified.

Figure 9C:
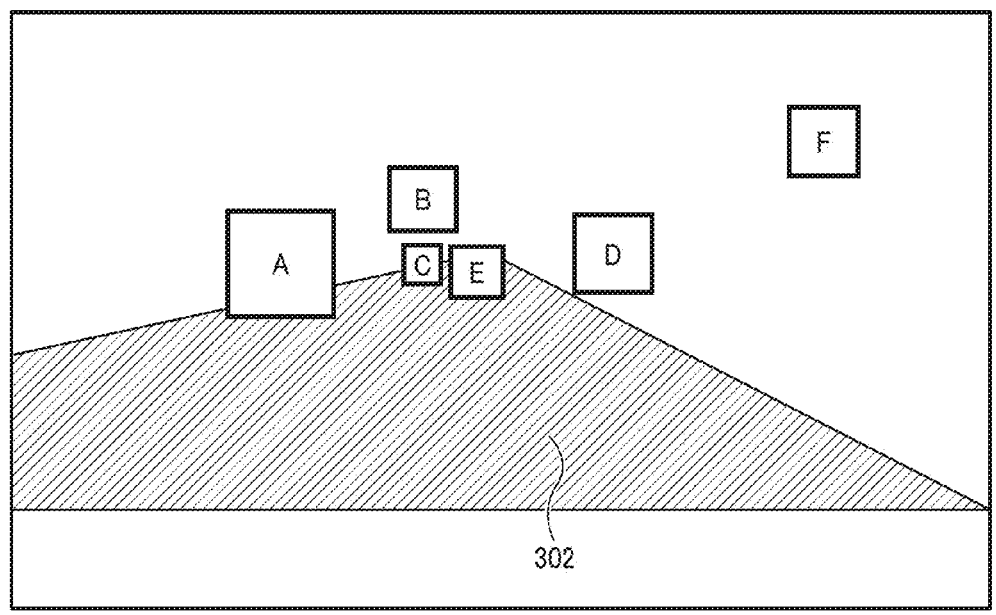
FIG. 9C is the image showing a detected road area.
Figure 14:
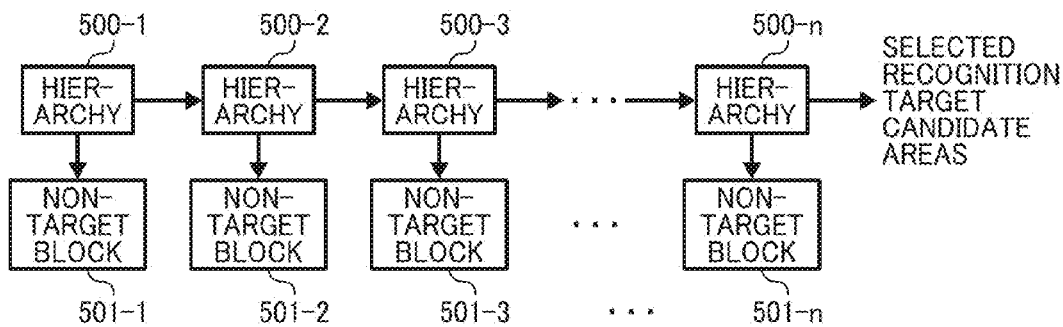
FIG. 14 is a diagram illustrating a configuration of target recognition processor.

After the points on the road area 301 are recognized, by performing interpolate process among the respective points, an entire road area 302 like that shown in FIG. 9C can be detected. More specifically, the road area detector 204 acquires the parallax distribution information of the parallax for each line on horizontal line parallax histogram. Then, the road area detector 204 converts the pixel distribution on the line parallax information into an approximate straight line data by approximating process using least-squares method and the Hough transform method.

The acquired approximate straight line of FIG. 9B has a gradient whose parallax is smaller as the position is moved up in the image, in the horizontal line parallax histogram corresponding to the lower portion of the parallax image. That is, this graph of FIG. 9B indicates that the pixels (pixel in the parallax image) positioned on the approximate straight line or near the approximate straight line are present in the respective lines in the parallax image from almost same distance and is the highest occupancy and these pixels shows that the position of captured targets becomes continuously far from the vehicle 100 as the position of the graph is moved up.

That is, the pixels positioned on the approximated straight line or near the approximate straight line in the horizontal line parallax histogram represent the borders of the road area 301. As a result, by identifying the pixels positioned on the approximated straight line or near the approximate straight line on the horizontal line parallax histogram, the entire road area 302 can be detected.

It is to be noted that, although detecting the road area can be accurately performed, using above-described method, alternatively, the road area may be detected by recognizing the side strip and dividing line from the luminance image and identifying the area where the continuous side strip and continuous dividing line are present.

Since the stereo image input unit 201 captures the image ahead of the vehicle 100, in the contents of the parallax image like that shown in FIG. 9C, the road area is the largest portion in the lower area of the image, and as the image is upward, the parallax of the road area is smaller. In addition, in the same horizontal line, the pixels constituting the road area have almost identical parallaxes. Accordingly, the pixels distributed on or near the approximated straight line on the horizontal line parallax histogram (distribution), identified by parallax distribution information of the respective horizontal line output from the parallax image calculator 203 correlate to the feature of the pixels constituting the road area. Therefore, it can be accurately assumed that the pixels distributed on or near the approximate straight line shown in FIG. 9B be the pixels constituting the road area.

As described above, the road area detector 204 identifies the image showing a road area to be shown and detects the image area occupied by the identified image pixels as the road area. Then, when the road area is detected, the road area detector 204 also detects the rest image area, such as sidewalk and side strip, other than the vehicle road based on the vehicle road area at step S106.

The recognition weighting unit 205 provides the recognition weighting to the road area and to the rest areas such as sidewalk, roadside, and background area based on the background ahead at step S107. That is, the recognition weighting unit 205 weights the probability of images of the recognition targets being present in each of the respective recognition areas detected by the road area detector 204. In the present embodiment, as illustrated in FIG. 10, when the images of the recognition targets, such as vehicle and the pedestrian on the road area are recognized, 1 recognition weighting is given to the road, and 0 recognition weighting is given to the rest image areas other than the road area. Although 0 and 1 recognition weighting are given as described above; alternatively, decimal recognition weighting can be given as illustrated in FIG. 11. The parameters of the recognition can be adjusted depending on the magnitude of the recognition weighting.

When the recognition weighting is not 0 (Yes at step S108), the target recognition processor 206 recognizes one or more recognition targets from the candidate set of recognition target areas, using the recognition target candidate dictionary 207, based on the recognition weighting given to the detected areas provided by the recognition weighting unit 205 at step S109. Then, the recognition result output unit 208 outputs the recognition processing result at step S110.

Herein, the detail recognition process to recognize the recognition target according to the present disclosure is described below. Initially, in order to recognize the recognition target, as illustrated in FIG. 12, rectangular or square blocks are set associated with target images in the captured image. The position and the size of the rectangular block in the captured image are determined by an upper left coordinate (Xs, Ys) and a lower right coordinate (Xe, Ye) of the rectangular. Then, using a large rectangular block 1, the captured images is scanned, and the target image is extracted so that the size of the rectangular block 1 almost matches the size of the target, and the rectangular blocks 1 is set for the extracted target images.

After setting the rectangular block 1, using a small rectangular block 2, the captured images is scanned, and then, the target image is extracted so that the size of the rectangular block 2 almost matches the size of the small target, and the rectangular block 2 is set for the extracted small target image. Accordingly, the rectangular blocks are set for the corresponding target images. The rectangular block is associated to the candidate set of recognition target areas.

Then, the target recognition processor 206 recognizes the recognition targets, using the recognition target candidate dictionary 207. Herein, the recognition target candidate dictionary 207 for recognizing the aimed recognition target is described below.

As illustrated in FIG. 13, the target recognition processor 206 calculates feature amount in a rectangular block of an evaluation target, based on a rectangular range 401 constituted by only white pixels and a rectangular range 402 constituted by only black pixels, represented by a shaded portion contained in a rectangular block 400 shown in FIG. 13. The target recognition processor 206 calculates a difference between the pixels in the evaluation target rectangular block and the white pixels of the rectangular range 401 and between the pixels in the evaluation target rectangular block and the black pixel value of the rectangular block 402, and therefore, the difference in the sums are set as the feature amount h(x) in the rectangular block 400.

The feature patterns A, B, C, and D shown in FIG. 13 almost fully cover features of ant targets. In the feature pattern A, the rectangular range 401 and the rectangular range 402 are positioned adjacent from side to side, and both ranges are positioned upper left from the center of the rectangular block 400. In the feature pattern B, the rectangular range 401 and the rectangular range 402 are positioned adjacent up and down, and both ranges are positioned upper left from the center of the rectangular block 400. In the feature pattern C, the rectangular range 402 is sandwiched between two rectangular ranges 401, and both ranges are positioned upper from the center of the rectangular block 400. In the feature pattern D, the rectangular range 401 and the rectangular range 402 are positioned diagonally, and both ranges are positioned left side from the center of the rectangular block 400.

Then, using the evaluation function like that shown in the formula I, evaluation weight values f(x) in the candidate sets of recognition target areas are calculated based on an evaluation function like that shown in the formula 1. By calculating the feature amount $h_t(x)$ in the entire pixels T in the rectangular blocks t (1 to T) (T; the number of patterns used for evaluation), the weight evaluation value f(x) is calculated by integrating weight coefficients $\alpha_t$ attached to each of the rectangular blocks.

Herein, the feature amount $h_t(x)$ and the weight coefficient $\alpha_t$ are obtained by collecting learning data for the image of the recognition target and by leveraging the learning data. By calculating the weight evaluation values for the above-described feature patterns A through D, the recognition target candidate dictionary 207 saves pairs of the feature pattern and weight coefficient $\alpha_t$ based on the calculated weight evaluation values $$f(x) = \sum_{t=1}^{T} \alpha_t h_t(x) \quad (1)$$

Herein, the target recognition processor 206 includes multiple hierarchies 500-1 through 500-n (n; natural integer number). In the respective hierarchies 500-1 through 500-n, the target is evaluated using the weight evaluation values of the evaluation function represented by the formula (1).

In the respective hierarchies 500-1 through 500-n, using a unique feature pattern for each of recognition targets or multiple feature patterns for each of recognition targets and weight coefficients associated to the feature pattern(s), the evaluation is performed based on the formula (I). In general, the huaraches vary from 500-1 to 500-n, the number of used patterns is gradually increased. Accordingly, recognition speed can becomes faster. For example, when the rectangular block that is smaller than the threshold range set in advance, in the hierarchy 500-1, the aimed recognition target is not present in the rectangular block is determined. Then, without evaluating the rectangular block, the block is handled as a non-target block 500-1. Similar determination is performed for respective hierarchies 500-2 to 500-n (n: natural integer). The rectangular block, in which the recognition target in the final hierarchy 500-n is not the recognition target, is not determined as the rectangular block in which the image of the aimed recognition target is present.

When the feature amount is calculated, the recognition weighting is additionally multiplied. Therefore, when 1 recognition weighting is given to the road area and 0 recognition weighting is given to the other area; that is, when the weight coefficient of the entire area other than the road area is 0, the recognition process is performed for the road area and is not performed for the areas other than the road area. Alternatively, the weight coefficient corresponding to decimal recognition weighting may be given, and the different weight coefficients may be set for the respective areas. In this case, even when the aimed recognition target is present in the respective area whose weight coefficient is set at a small value and the area whose weight coefficient is set at a larger value, the weight evaluation value in the area whose weight coefficient is small is small, that is not the image of the recognition target is determined.

Accordingly, the recognition result of the recognition target in the area whose weight coefficient is small is bad, and the image of an object similar to the recognition target can be eliminated, thereby reducing the generation of false recognition.

Figure 15:
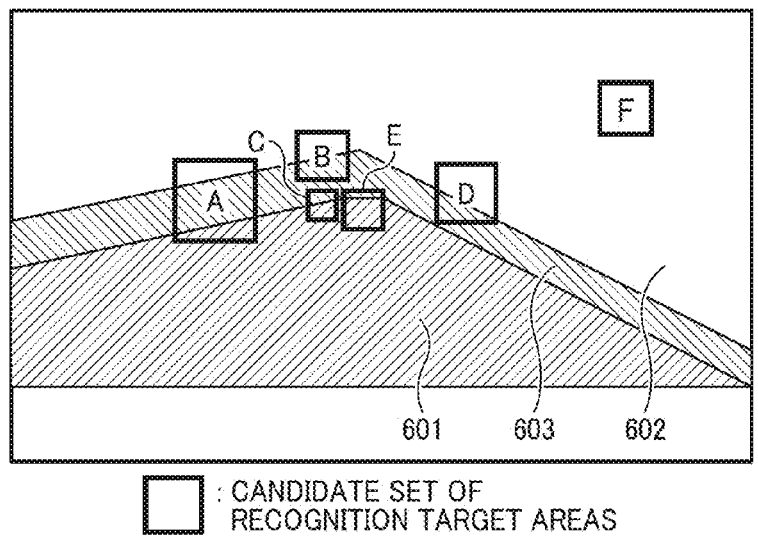
FIG. 15 is one example of image containing a rectangular candidate set of recognition target areas, road area, and weight recognition area.

FIG. 15 is image containing one example of the candidate set of recognition target areas set based on a detected recognition area in the captured image. In FIG. 15, the rectangular blocks surrounded by bold lines represent the candidate set of recognition target areas. In this embodiment, the recognition weighting unit 605 weights most heavily the road area 603 in the recognition areas detected by the road area detector 204 to detect another vehicle. Since the candidate set of recognition target areas A, C, and D are positioned on a road area 601 where 1 recognition weighting is given, the recognition process is performed. Since the candidate set of recognition target areas B, D, and F are positioned on a non-recognition area 602 where 0 recognition weighting is given, the recognition process is not performed.

As described above, the target recognition processor 206 does not perform the recognition process for the area where the recognition target is not present. The target recognition processor 206 can eliminate the candidate set of recognition target areas where the image of the object similar to the recognition target may be present, from the recognition targets. Accordingly, compared to the system that perform recognition processing for the entire candidate set of recognition target areas, falsely recognition can be reduced and the processing time can be shortened.

Next, another recognition process in the target recognition system 1 according to a first variation is described below. As illustrated in FIG. 15, when the road area 601 is detected, the recognition weighting unit 205 weights the probability of images of the recognition targets being present in each of the respective recognition areas detected by the road area detector 204. For example, for the purpose of recognizing the image of the pedestrian, the sidewalk and roadside strip 603 are detected based on the road area 601, treating the detected sidewalk and side strip 603 as a priority recognition area, and the recognition weighting unit 205 assigns 1 recognition weighting to the sidewalk and roadside 603. That is, the recognition weighting unit 605 weights most heavily the sidewalk and the roadside area 604 in the recognition areas detected by the road area detector 204.

With this setting, the system can alert the phenomena that the pedestrian runs into to vehicle lane to the driver. Accordingly, by setting the recognition weighting for recognition target depending on the intended use, recognition process can be performed with higher degree of accuracy corresponding to the intended use.

Figure 16:
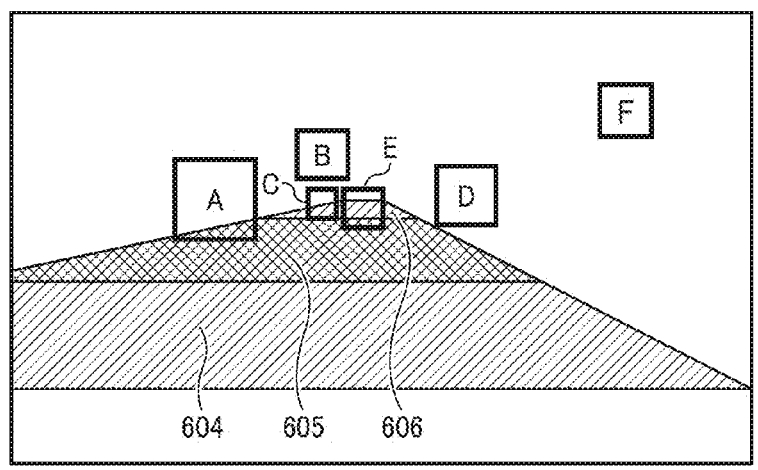
FIG. 16 is another example of image containing a rectangular candidate set of recognition target areas, the road area, and the weight recognition area.

Next, yet another recognition process in the target recognition system 200 according to a second variation is described below. As illustrated in FIG. 16, when the road area 601 is detected, the recognition weighting unit 205 weights the probability of images of the recognition targets being present in each of the respective recognition areas detected by the road area detector 204s. For example, the area close to the driver front side area is the area where the driver is likely to collide another vehicle and pedestrian, is treated as a priority recognition area. In order to set the priority, as illustrated in FIG. 16, the range within predetermined distances from the driver is set as the priority recognition area. That is, the recognition weighting in the priority recognition area 604 positioned close to the driver is set heavier than a recognition area positioned far from the vehicle 100. That is, the recognition weighting unit 205 weights most heavily a predetermined range of the road within a certain distance from the vehicle 100 in the recognition areas detected by the road area detector 204. Accordingly, the recognition target can be recognized with a higher degree of accuracy in the close, front road where the vehicle is likely to collide against the vehicle and the pedestrian.

Figure 17:
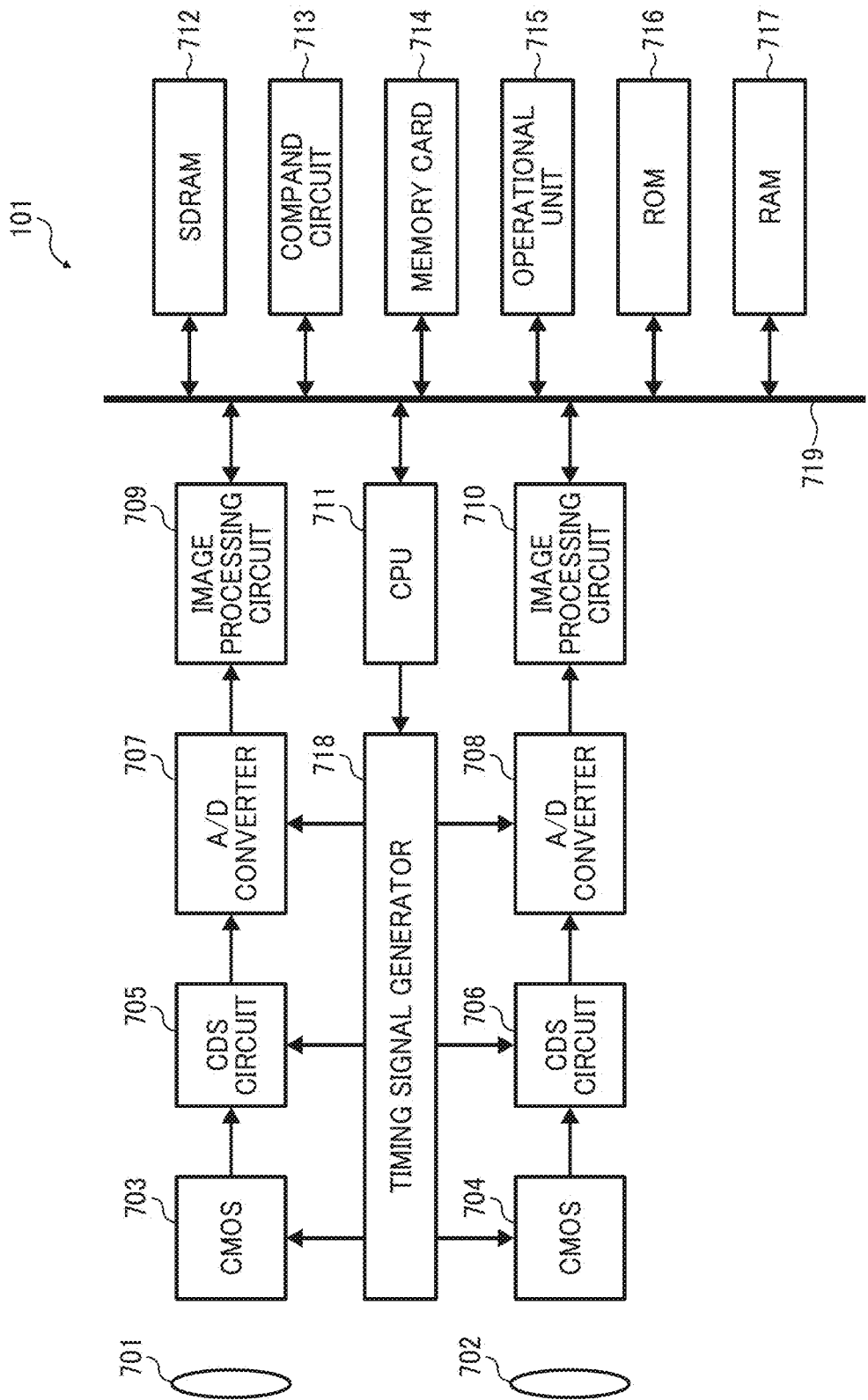
FIG. 17 is a block diagram illustrating a hardware configuration of the stereo camera system.

A hardware configuration of the in-vehicle stereo camera imaging device to recognize the recognition target is described below with reference to FIG. 17. FIG. 17 is a block diagram illustrating one example of a hardware configuration of the stereo camera. In FIG. 17, a light reflected from the object is input to Complementary Metal Oxide Semiconductors (CMOS) 503 and 504 corresponding to the image sensors 112A and 112B (see FIG. 4) through the both imaging lenses 501 and 502 (112A and 112B) in the stereo camera. The CMOS 503 and 504 convert the optical image formed on the captured image into electrical signals for outputting as analog image data. Then, signal processor 114A and 114B include correlated double sampling (CDS) circuits 505 and 506, analog-digital (A/D) converters 507 and 508, and image processing circuits 509 and 510. Each of the process hardware unit 120 and the MPU 140 includes a central processing unit (CPU) 511, a synchronous dynamic random access memory (DRAM) 512, a compand (compress-expand) circuit 513, a read only memory (ROM) 516, random access memory (RAM) 517, and a timing signal generator circuit 518. Noise of the analog image data output from the CMOS 503 and 504 is removed by the CDS circuits 505 and 506, and the noise-removed image data is converted into digital signal, by the A/D converters 507 and 508, for outputting to the image processing circuits 509 and 510.

Using the SDRAM 512 that temporarily saves the image data, the image processing circuits 509 and 510 performs various image processing, such as luminance-hue (YcrCb) conversion, white balance control processing, contrast correction processing, and edge emphasis processing. In the processes of image processing, shade of the image information is adjusted in the white balance processing, contrast of the image information is adjusted in the contrast correction processing, sharpness of the image information is adjusted in the edge emphasis processing, and color of the image information is adjusted in the color conversion processing.

In addition, the image information in which the signal process and image process is executed is memorized in the memory card 514 via the compand circuit 513. The compand circuit 513 compresses the image information output from the image processing circuits 509 and 510 and expands the image information read from the memory card 514, to output the compressed and expanded information to the image processing circuit. The timings of the CMOS 503 and 504, the CDS circuits 505 and 506, and the A/D converters 507 and 508 are controlled by the CPU 511 via the timing signal generator 518 that generates the timing signal. Furthermore, the CPU 511 further controls the image processing circuits 509 and 510, the compand circuit 513, and the memory card 514.

In the stereo camera system, the CPU 511 performs various calculations depending on the target recognition program. The CPU 511 installs ROM 516 dedicated for storing the image processing program and RAM 517 that is a readably memory including a work area used for the various processes and various data storage area. The ROM 516 and RAM 517 are connected by a bus line 519. With this configuration, the stereo camera is constituted by module configuration including the process function to perform parallax calculation executed in the in-vehicle stereo camera system, to detect the candidate set of recognition target areas using the luminance image, perform the target recognition function to eliminate the false detection of the candidate set of recognition target areas As the actual hardware configuration, the CPU 511 reads out the image processing program from the ROM 516, and the respective process are road on the main memory and the target recognition result is output.

In addition, the method to recognize the recognition target is executed by the target recognition program to execute the recognition target. The target recognition program can engage a computer to execute a recognition area detecting process to detect multiple recognition areas from the captured image; a recognition weighting process to weight the probability of images of the recognition targets being present in each of the respective recognition areas detected by the recognition area detector; and a target recognition process to recognize the one or more recognition targets in a specified recognition area based on the recognition weighting given to the respective recognition areas. With this configuration, the generation of false recognition can be prevented as describe above.

Herein, the present invention of the present disclosure can provide, in addition to the target recognition system and the target recognition method described above, a computer readable program for executing the method. The computer program to be executed by the target recognition system according to the present embodiment can be provided by being recorded in a computer-readable recording medium such as a CD-ROM, an FD, a CD-R, and a DVD as a file in an installable format or an executable format.

Alternatively, the computer program to be executed by the target recognition system according to the present embodiment can be provided by being downloaded by a predetermined transmission device over a transmission medium, such as telephone line, dedicated network, Internet, and other communication systems. Herein, while transmitting the program, at least a part of computer program should be transmitted through the transmission medium. That is, not all of data constituting the computer program should be present in the communication medium (signal) at one time. The communication medium (signal) is implemented by a carrier wave of a computer data signal containing the computer program. A communication method to transmit the computer program from the predetermined transmission device may contain a continuous transmission process to transmit the data constituting the computer program and an intermittent transmission process.

Numerous additional modifications and variations are possible in light of the above teachings. It is therefore to be understood that, within the scope of the appended claims, the disclosure of this patent specification may be practiced otherwise than as specifically described herein.

What is claimed is:

1. A target recognition system to recognize one or more recognition targets, operatively connected to an imaging device to capture an image of an area ahead of the target recognition system, comprising:
    a recognition area detector to detect multiple recognition areas from the captured image;
    a recognition weighting unit to weight the probability of images of the recognition targets being present in each of the respective recognition areas detected by the recognition area detector; and
    a target recognition processor to recognize the one or more recognition targets in a specified recognition area based on the recognition weighting given to the respective recognition areas.

2. The target recognition system according to claim 1, wherein the imaging device has a stereo imaging device to capture a stereo image including two images,
    the recognition system further comprising a parallax calculator to calculate parallax of the captured image from the two images in the stereo image,
    wherein the recognition area detector detects multiple recognition areas from a luminance image of one of the images in the stereo image or a parallax image having pixel values corresponding to the parallax calculated by the parallax calculator.

3. The target recognition system according to claim 2, wherein the recognition area detector classifies the multiple recognition areas, using the parallax of the captured image calculated by the parallax calculator, based on frequency distribution at respective heights in the captured image.

4. The target recognition system according to claim 1, wherein the recognition weighting unit weights most heavily a road area in the recognition areas detected by the recognition area detector.

5. The target recognition system according to claim 1, wherein the recognition weighting unit weights most heavily a sidewalk and a roadside area in the recognition areas detected by the recognition area detector.

6. The target recognition system according to claim 1, wherein the recognition weighting unit weights most heavily a predetermined range of the road within a certain distance from the target recognition system in the recognition areas detected by the recognition area detector.

7. The target recognition system according to claim 1, further comprising:
    a target candidate detector to detect a candidate set of recognition target areas based on a luminance of the captured image,
    wherein the target recognition processor recognizes the one or more recognition targets from the candidate set of recognition target areas detected by the target candidate detector in the specified recognition area detected by the recognition area detector based on the weighting of the recognition areas.

8. A target recognition method executed by a target recognition system to recognize one or more recognition targets, operatively connected to an imaging device to capture a stereo image of an area ahead of the target recognition system,
    the method comprising the steps of:
    detecting multiple recognition areas from the captured image;
    setting recognition weight indicating existence probability of images of the recognition targets to the respective recognition areas; and recognizing the one or more recognition targets in a specified recognition area based on the recognition weighting given to the respective recognition areas.

9. The target recognition method according to claim 8, further comprising:

capturing a stereo image including two images, calculating parallax of the captured image from the two images in the stereo image, wherein the multiple recognition areas are detected from a luminance image of one of the images in the stereo image or a parallax image having pixel values corresponding to the parallax.

10. The target recognition method according to claim 8, further comprising:

detecting a candidate set of recognition target areas based on a luminance of the captured image, wherein the one or more recognition targets are recognized from the candidate set of recognition target areas in the specified recognition area based on the recognition weighting give to the respective recognition areas.

* * * * *